(12) United States Patent
Raut et al.

(10) Patent No.: US 11,428,535 B2
(45) Date of Patent: Aug. 30, 2022

(54) SYSTEM AND METHOD FOR DETERMINING A SIGN TYPE OF A ROAD SIGN

(71) Applicant: HERE Global B.V., Eindhoven (NL)

(72) Inventors: Advait Mohan Raut, Virar West (IN); Leon Stenneth, Chicago, IL (US); Bruce Bernhardt, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 405 days.

(21) Appl. No.: 16/706,263

(22) Filed: Dec. 6, 2019

(65) Prior Publication Data

US 2021/0172744 A1  Jun. 10, 2021

(51) Int. Cl.

| G01C 21/32 | (2006.01) |
|---|---|
| G06N 5/04 | (2006.01) |
| G06N 20/00 | (2019.01) |
| G06F 17/18 | (2006.01) |
| G06F 16/29 | (2019.01) |
| G08G 1/0967 | (2006.01) |
| G01C 21/36 | (2006.01) |

(52) U.S. Cl.
CPC ............ *G01C 21/32* (2013.01); *G06N 5/04* (2013.01); *G01C 21/3602* (2013.01); *G06F 16/29* (2019.01); *G06F 17/18* (2013.01); *G06N 20/00* (2019.01); *G08G 1/0967* (2013.01)

(58) Field of Classification Search
CPC ...... G01C 21/32; G01C 21/3602; G06N 5/04; G06N 20/00; G06F 16/29; G06F 17/18; G08G 1/0967
See application file for complete search history.

(56) References Cited

U.S. PATENT DOCUMENTS

| 8,064,643 | B2 | 11/2011 | Stein et al. | |
|---|---|---|---|---|
| 9,336,448 | B2 | 5/2016 | Fowe et al. | |
| 9,459,626 | B2 | 10/2016 | Chen et al. | |
| 2016/0104049 | A1* | 4/2016 | Stenneth | G06V 20/63 382/155 |
| 2016/0170414 | A1* | 6/2016 | Chen | G05D 1/0221 701/27 |
| 2018/0025628 | A1* | 1/2018 | Ivanov | G01C 21/3697 701/117 |
| 2019/0205674 | A1* | 7/2019 | Silver | B60W 40/105 |

(Continued)

OTHER PUBLICATIONS

Anastassov et al., "Analysis of OEM Sensor Data for Determination of Speed Sign Placement on Road Maps", 22nd ITS World Congress, Paper No. ITS-2121, Oct. 2015, pp. 1-11.

*Primary Examiner* — Hunter B Lonsberry
*Assistant Examiner* — Harrison Heflin
(74) *Attorney, Agent, or Firm* — Jeffrey R. Moisan; HERE Technologies (57) ABSTRACT

A system, a method, and a computer program product for determining a sign type of a road sign are disclosed herein. The system comprises a memory configured to store computer-executable instructions and one or more processors configured to execute the instructions to obtain sensor data associated with the road sign, wherein the sensor data comprises data associated with counts of road sign observations, determine one or more features associated with the road sign, based on the obtained sensor data, and determine the sign type of the road sign, based on the one or more features.

10 Claims, 7 Drawing Sheets

(56) References Cited

U.S. PATENT DOCUMENTS

2019/0311207 A1* 10/2019 Oniwa .................. B60W 50/12
2020/0191601 A1*  6/2020 Jiang .................... G01S 17/931
2020/0401823 A1* 12/2020 Miller ................... G06V 10/82

* cited by examiner

| HOUR | SPEED 1 | ... | SPEED j-1 | SPEED j | SPEED j+1 | ... | SPEED n |
|---|---|---|---|---|---|---|---|
| 1 | $C_{1,1}$ | ... | $C_{1,j-1}$ | $C_{1,j}$ | $C_{1,j+1}$ | ... | $C_{1,n}$ |
| ... | ... | ... | ... | ... | ... | ... | ... |
| i | $C_{i,1}$ | ... | $C_{i,j-1}$ | $C_{i,j}$ | $C_{i,j+1}$ | ... | $C_{i,n}$ |
| ... | ... | ... | ... | ... | ... | ... | ... |
| m | $C_{m,1}$ | ... | $C_{m,j-1}$ | $C_{m,j}$ | $C_{m,j+1}$ | ... | $C_{m,n}$ |

401

| HOUR | SPEED 1 | ... | SPEED j-1 | SPEED j | SPEED j+1 | ... | SPEED n |
|---|---|---|---|---|---|---|---|
| 1 | $P_{1,1}$ | ... | $P_{1,j-1}$ | $P_{1,j}$ | $P_{1,j+1}$ | ... | $P_{1,n}$ |
| ... | ... | ... | ... | ... | ... | ... | ... |
| i | $P_{i,1}$ | ... | $P_{i,j-1}$ | $P_{i,j}$ | $P_{i,j+1}$ | ... | $P_{i,n}$ |
| ... | ... | ... | ... | ... | ... | ... | ... |
| m | $P_{m,1}$ | ... | $P_{m,j-1}$ | $P_{m,j}$ | $P_{m,j+1}$ | ... | $P_{m,n}$ |

| FEATURE NAME | CATEGORY |
|---|---|
| EXCLUSIVITY SCORE | TEMPORAL |
| MEAN-OF-HIGHEST | TEMPORAL |
| STANDARD-DEVIATION-OF-HIGHEST | TEMPORAL |
| LN_VEH_PER_HR | TEMPORAL |
| LN_SLOTS_CONSIDERED | TEMPORAL |
| ESTIMATED-VERTICAL-OFFSET | SPATIAL PLACEMENT |

SYSTEM AND METHOD FOR DETERMINING A SIGN TYPE OF A ROAD SIGN

TECHNOLOGICAL FIELD

The present disclosure generally relates to routing and navigation systems, and more particularly relates to determining type of road signs for routing and navigation applications.

BACKGROUND

Currently, various navigation applications are available for vehicle navigation. These navigation applications generally use mapping applications, such as those offered by third party service providers like websites, mobile app providers and the like, to request navigation related data. The navigation related data may include data about navigation routes, signs posted on these routes, sign information and the like, which may be obtained by using various navigation devices. Navigation devices based on Global Positioning System (GPS) technology have become common, and these devices are capable of determining the location of a device for navigating the vehicles on a requested route. However, for accurate vehicle navigation, such as in automated driving applications, map data associated with the mapping application should be accurate. This data may include data about road signs which should be accurate in real time for correct vehicle guidance.

In some navigation applications, navigation related data may be collected by probe vehicles and provided to the mapping applications. However, probe vehicles may be limited in number and may not be able to provide real-time data updates to vehicles.

SUMMARY

In some navigation applications, mapping applications may rely on data obtained from map databases. Such data, which includes the road sign data, may be obtained by using data from sensors placed in vehicles. In some example embodiments, the vehicles may be specially deployed vehicles, such as probe vehicles, which may travel through various navigation routes and collect data for map databases. However, such vehicles are only limited in number resulting in requiring a large amount of time in collecting data. Further, these vehicles cannot travel possibly all the navigation routes manually to collect map data. Thus, such map data cannot be relied upon for navigation applications requiring real-time updates on map data. Also, such data may not be accurate in cases where data changes based on hourly basis, or based on road conditions, or based on weather conditions and the like.

The methods, systems and computer program products disclosed in various embodiments disclosed herein provide accurate map data is using the map data collected by user vehicles equipped with sensors, perform analysis of the map data and use it along with advanced technological processing techniques, such as machine learning, to predict further map data. The map data may include data about road signs, such as speed limit signs, information regarding road geometry, lane geometry, road link connectivity, road type, and the like. In some example embodiments, the information in the map databases may be enriched with data sources that provide traffic data, weather related data, and information related to road maintenance. A plurality of sensors, installed onboard the vehicles may provide information related to road signs to augment map data of the map databases or remote map data providers, alert the user of the vehicles of a hazardous condition or even provide input for controlling the vehicle in an autonomous or semi-autonomous manner. Accurate road sign information is essential for navigation of vehicles and also for providing environmental awareness for ensuring vehicle safety, which has been a primary concern for automobile manufacturers and related service providers.

A system, method, and computer program product are provided in accordance with an example embodiment described herein for accurately determining a sign type of a road sign.

In one aspect, a system for determining a sign type of a road sign is disclosed. The system may comprise a memory configured to store computer-executable instructions and one or more processors configured to execute the instructions to: obtain sensor data associated with the road sign, wherein the sensor data comprises data associated with counts of road sign observations, determine one or more features associated with the road sign, based on the obtained sensor data and determine the sign type of the road sign, based on the one or more features.

According to some embodiments, the sign type indicates that the road sign is one of a static sign or a mechanical variable sign.

According to some embodiments, the one or more processors may be further configured to update map data of the road sign, based on the determined sign type.

According to some embodiments, wherein to update the map data, the one or more processors may be further configured to update a location of the road sign, based on the determined sign type indicating that the road sign is the static sign.

According to some embodiments, wherein to update the map data, the one or more processors may be further configured to add the road sign to a blacklist, based on the determined sign type indicating that the road sign is the mechanical variable sign.

According to some embodiments, wherein to determine the one or more features, the one or more processors may be further configured to generate a first matrix based on the obtained sensor data, wherein the first matrix is a representation of the counts of the road sign observations over a threshold time period and generate a second matrix based on the first matrix, wherein the second matrix comprises row wise normalized counts of the road sign observations.

According to some embodiments, wherein the one or more features comprise an exclusivity score feature, a mean-of-highest feature, or a standard-deviation-of-highest feature and wherein to determine the one or more features, the one or more processors may be further configured to perform one or more of determine a maximum count in each row of the second matrix and compute a mean of the maximum counts, determine a max column in the second matrix that has a maximum count in the second matrix and compute a mean for the max column of the second matrix, or compute a standard deviation for the max column of the second matrix.

According to some embodiments, wherein the one or more features further comprise an estimated-vertical-offset feature, and wherein to determine the estimated-vertical-offset-feature, the one or more processors may be further configured to obtain vertical offset data associated with the road sign and compute a median for the obtained vertical offset data.

According to some embodiments, the one or more processors may be further configured to input the one or more features into a machine learning model to determine the sign type of the road sign.

In another aspect, a method for determining a sign type of a road sign is disclosed. The method may comprise obtaining sensor data associated with the road sign, wherein the sensor data comprises data associated with counts of road sign observations, determining one or more features associated with the road sign, based on the obtained sensor data and ground truth that is obtained independently, and determining the sign type of the road sign, based on the one or more features.

In yet another aspect, a computer program product comprising a non-transitory computer readable medium having stored thereon computer executable instruction which when executed by one or more processors, cause the one or more processors to carry out operations for determining a sign type of a road sign, the operations comprising: obtaining sensor data associated with the road sign, wherein the sensor data comprises data associated with counts of road sign observations, determining one or more features associated with the road sign, based on the obtained sensor data, and determining the sign type of the road sign, based on the one or more features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Having thus described example embodiments of the invention in general terms, reference will now be made to the accompanying drawings, which are not necessarily drawn to scale, and wherein:

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, method and computer program product are provided herein in accordance with one or more example embodiments for determining a sign type of a road sign. The road sign may include any of one or more road signs that a user of a vehicle may encounter while travelling along a route. In various embodiments, the one or more road signs may include a speed limit sign, a directional guidance sign, a destination signboard, a signboard indicating route deviation, a parking signboard, a signboard indicating some ongoing work along a route and/or the like. In some example embodiments, the road sign may be one of the sign type such as a static road sign or a mechanically variable road sign. In some example embodiments, the static road sign may further be a conditional static road sign. Generally, the static road sign and the mechanically variable road sign have identical visual features. Therefore, the vehicle, such as a vehicle equipped with smart sensors, may not be able to differentiate between the static road sign and the mechanical variable road sign. So, the vehicles' smart sensors may mistakenly report both as static road signs.

In various embodiments, the system, method, and computer program product provided herein may accurately determine whether the road sign is a static road sign or a mechanical variable road sign using the sensor data associated with the road sign. For the road sign which changes mechanically, such as the mechanical variable road sign, updating sensor provided data about the road sign in a map database associated with a mapping application may become problematic. This is because such a road sign, for example a mechanical variable speed limit sign, may report different values at different time observation intervals. For example a the mechanical variable speed limit sign may report different speed limits at different times of day, or at times of vehicle based restriction, or the like. This may be problematic as the vehicles' smart sensors may not be able to determine if a road sign on a road changes as the vehicle passes the road sign. If the road sign is changeable and it changes often, a method of updating the road sign/map data becomes more complex. However, the method, system, and computer program product disclosed herein provide for accurately updating road sign type information in the map database using processing techniques which offer less complexity. According to some embodiments, the accurate road sign information may further be used to perform one or more navigation functions. Some non-limiting examples of navigation functions may include providing vehicle speed guidance, vehicle speed handling and/or control, providing a route for navigation(e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like. According to some embodiments, the system, method, and computer program product provided herein may update the map data including the road sign data on hourly/daily basis, by using sensor data of user vehicles. Since, there may be potentially thousands of such user vehicles therefore; the map data may be updated in near real time. This provides an ability to disseminate any changed information about the road sign to vehicles that will be approaching a section of the road affected by the change as soon as the change is known, using the method, system and computer program product disclosed herein.

Figure 1:
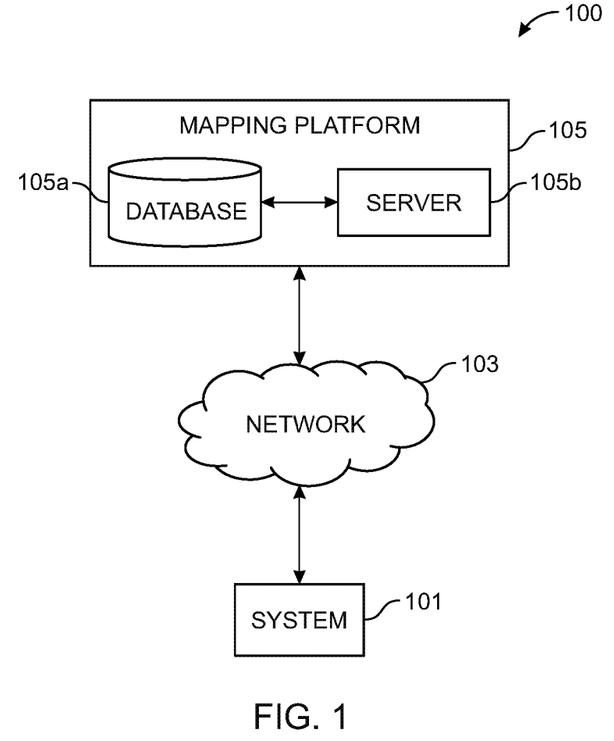
FIG. 1 illustrates a block diagram showing an example architecture of a system for determining a sign type for a road sign, in accordance with one or more example embodiments.

FIG. 1 illustrates a block diagram 100 showing an example architecture of a system for determining a sign type for a road sign, in accordance with one or more example embodiments. As illustrated in FIG. 1, the block diagram 100 may comprise a system 101, a mapping platform 105, and a network 103. In various embodiments, the system 101 may be an (Original Equipment Manufacturer) OEM cloud. According to some embodiments, the system 101 may be a backend server, a remotely located server, or the like. In some embodiments, the system 101 may be onboard a vehicle, such as the system 101 may be a navigation system installed in the vehicle. In various embodiments, the vehicle may be an autonomous vehicle, a semiautonomous vehicle, or a manual vehicle. In an embodiment, the system 101 may be a server 105b of the mapping platform 105 and therefore may be co-located with or within the mapping platform 105. The system 101 may be communicatively coupled with the mapping platform 105 over the network 103.

The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 105, via the network 103, where the mapping platform 105 may comprise a map database 105a for storing map data, and a processing server 105b for carrying out the processing functions associated with the mapping platform 105. The map database 105a may store node data, road segment data or link data, point of interest (POI) data, posted signs related data, such as road sign data or the like. The map database 105a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as used by vehicles, for example, cars, trucks, buses, motorcycles, and/or other entities.

Optionally, the map database 105a may contain path segment and node data records or other data that may represent pedestrian paths or areas in addition to or instead of the vehicle road record data, for example. The road/link segments and nodes may be associated with attributes, such as geographic coordinates, street names, address ranges, lane level speed profile (historically derived speed limits for a lane), lane level maneuver pattern (lane change patterns at intersections), and other navigation related attributes, as well as POIs, such as fueling stations, hotels, restaurants, museums, stadiums, offices, auto repair shops, buildings, stores, parks, etc. The map database 105a may include data about the POIs and their respective locations in the POI records. The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs and last mile connectivity information from different locations in a geographical region. The map database may be communicatively coupled to the processing server 105b.

The processing server 105b may comprise processing means and communication means. For example, the processing means may comprise one or more processors configured to process requests received from the system 101. The processing means may fetch map data from the map database 105a and transmit the same to the system 101 in a format suitable for use by the system 101. In one or more example embodiments, the mapping platform 105 may periodically communicate with the system 101 via the processing means to update a local cache of the map data stored on the system 101. Accordingly, in some example embodiments, the map data may also be stored on the system 101 and may be updated based on periodic communication with the mapping platform 105. In some example embodiments, as disclosed in conjunction with the various embodiments disclosed herein, the system 101 may be used to determine a sign type of a road sign.

Figure 2:
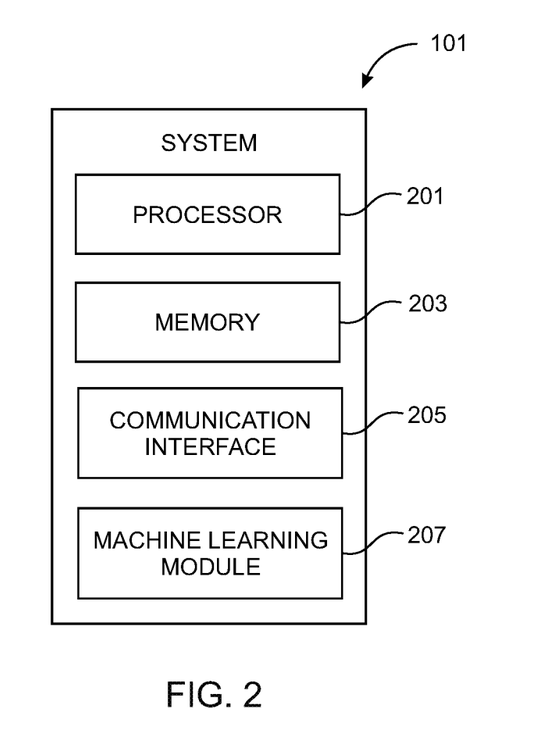
FIG. 2 illustrates a block diagram of a system for determining a sign type of a road sign, in accordance with one or more example embodiments.

FIG. 2 illustrates a block diagram of the system 101 for determining the sign type of the road sign, in accordance with one or more example embodiments of the present invention. The system 101 may include a processing means such as at least one processor 201, storage means such as a memory 203, and a communication means such as at least one communication interface 205. Additionally, the system 101 may include a machine learning module 207. The processor 201 may retrieve computer program code instructions that may be stored in the memory 203 for execution of computer program code instructions, which may be configured for determining sign type of a road sign.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with a memory 203 via a bus for passing information among components of structure 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

Additionally, a machine learning module 207 may be included in the system 101. In some example embodiments, the processor 201 may be embodied within the memory 203. The machine learning module 207 may be configured to store a machine learning model. In various embodiments, the machine learning model may comprise at least one classification algorithm. According to some embodiments, the at least one classification algorithm may be a random forest algorithm, a support vector machine (SVM) algorithm, a neural network (NN) algorithm, a gradient boosting machine (GBM) algorithm, and the like.

In some embodiments, the processor 201 may be configured to provide Internet-of-Things (IoT) related capabilities to users of the system 101, where the users may be a traveler, a rider, a pedestrian, a driver of the vehicle and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101. For example, the communication interface may comprise I/O interface which may be in the form of a GUI, a touch interface, a voice enabled interface, a keypad and the like. For example, the communication interface may be a touch enabled interface of a navigation device installed in a vehicle, which may also display various navigation related data to the user of the vehicle. Such navigation related data may include information about upcoming conditions on a route, route display, alerts about vehicle speed, user assistance while driving and the like. In some example embodiments, the communication interface 205 may provide information about various road signs, such as speed signs posted on a road.

Figure 3:
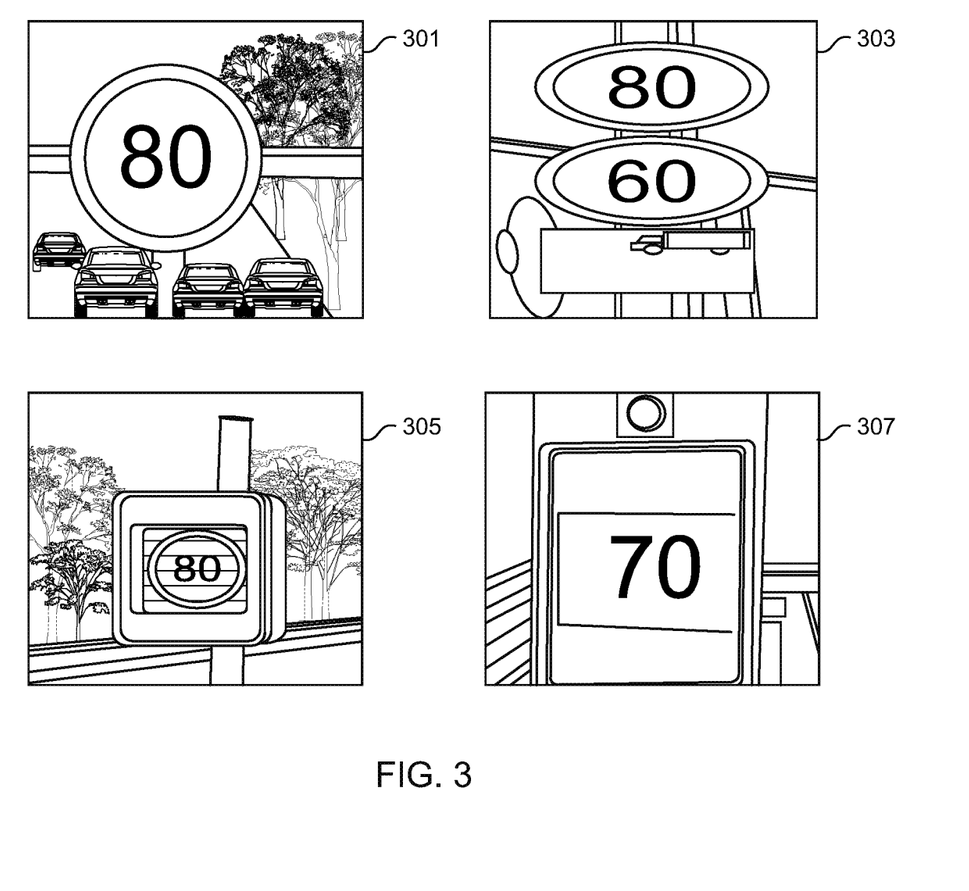
FIG. 3 illustrates various speed signs posted on a road, in accordance with one or more example embodiments.

FIG. 3 illustrates various categories of road signs, such as speed signs posted on a road, in accordance with one or more example embodiments. As illustrated in FIG. 3, a road sign 301 may correspond to a static speed sign, a road sign 303 may correspond to a conditional static speed sign, a road sign 305 may correspond to a mechanical variable speed sign, and a road sign 307 may correspond to a variable speed sign, such as a digital variable speed sign. In various embodiments, the static speed sign 301 may be a sign with a speed limit permanently fixed on the sign.

According to some embodiments, the static speed sign 301 may have a special case such as the conditional static speed sign 303. In various embodiments, the conditional static speed sign 303 may correspond to one or more static speed signs posted on a same pole. For example, the conditional static speed sign 303 may have the one or more static speeds based on a vehicle type (i.e. car, truck, and the like), a road split (i.e. intersections of one or more road segments at a node), and/or a time of a day and/or a weather condition such as one for a regular dry day and another speed limit for a wet or snowy day.

In various embodiments, the mechanical variable speed sign 305 may be a sign with a varying speed limit on the sign. According to some embodiments, a speed limit value on the mechanical variable speed sign 305 may vary. In some embodiments, the speed limit value on the mechanical variable speed sign may flip between two values. For example, the mechanical variable speed sign 305 may be made up of one or more panes, and by mechanically flipping the one or more panes, the speed limit value on the mechanical variable speed sign 305 may change. According to some embodiments, the speed limit value on the mechanical variable speed sign 305 may change in accordance with time (i.e. hourly, weekly, monthly, and/or the like), road conditions, atmospheric conditions (i.e. rainy), and/or the like.

In various embodiments, the static speed sign 301 and the mechanical variable speed sign 305 may be visually identical. For example, the static speed sign 301 and the mechanical variable speed sign 305 have visually similar features such as white background, the speed limit value posted in black color, and the speed limit value within a red circle. Thus, for a visual road sign recognition system, such as a camera, an image sensor and the like, it may be difficult to distinguish the static speed sign 301 from the mechanical variable speed sign 305 based on the visual features. Consequently, a system using visual feature extraction for differentiating various road signs, such as the static speed sign 301 and the mechanical variable speed sign 305, may erroneously classify both these types of signs as static road signs. Such erroneous classification may further lead to an erroneous data update in a map database, such as the map database 105a of the mapping platform 105, which may be disastrous for use in navigation based applications. However, using the method, system, and computer program product disclosed herein, such errors can be avoided and accurate road sign data can be updated in the map database. This may further provide more reliable and secure navigation applications and also more accurate road sign detection.

In various embodiments, the variable speed sign 307 may be a sign with a varying speed limit on the sign. In various example embodiments, the variable speed sign 307 may be a digital speed sign, an electronic speed sign, or the like. According to some embodiments, a speed limit value on the variable speed sign 307 may change more than twice. In various embodiments, the variable speed sign 307 and the mechanical speed sign 305 may have different visual features. In some embodiments, the vehicles observing the various road signs may be equipped with smart sensors, which may be configured for taking road sign observations and for detecting the presence of these road signs at various locations. Further, these road sign observations may be reported to the mapping platform 105. The mapping platform 105 may be configured for performing further processing on these road sign observations, such as using the system 101 and the machine learning module 207, to use the road sign observations for correctly updating the map data and also for providing real-time, accurate map updates to users of a mapping application supported by the mapping platform 105.

Figure 4A:
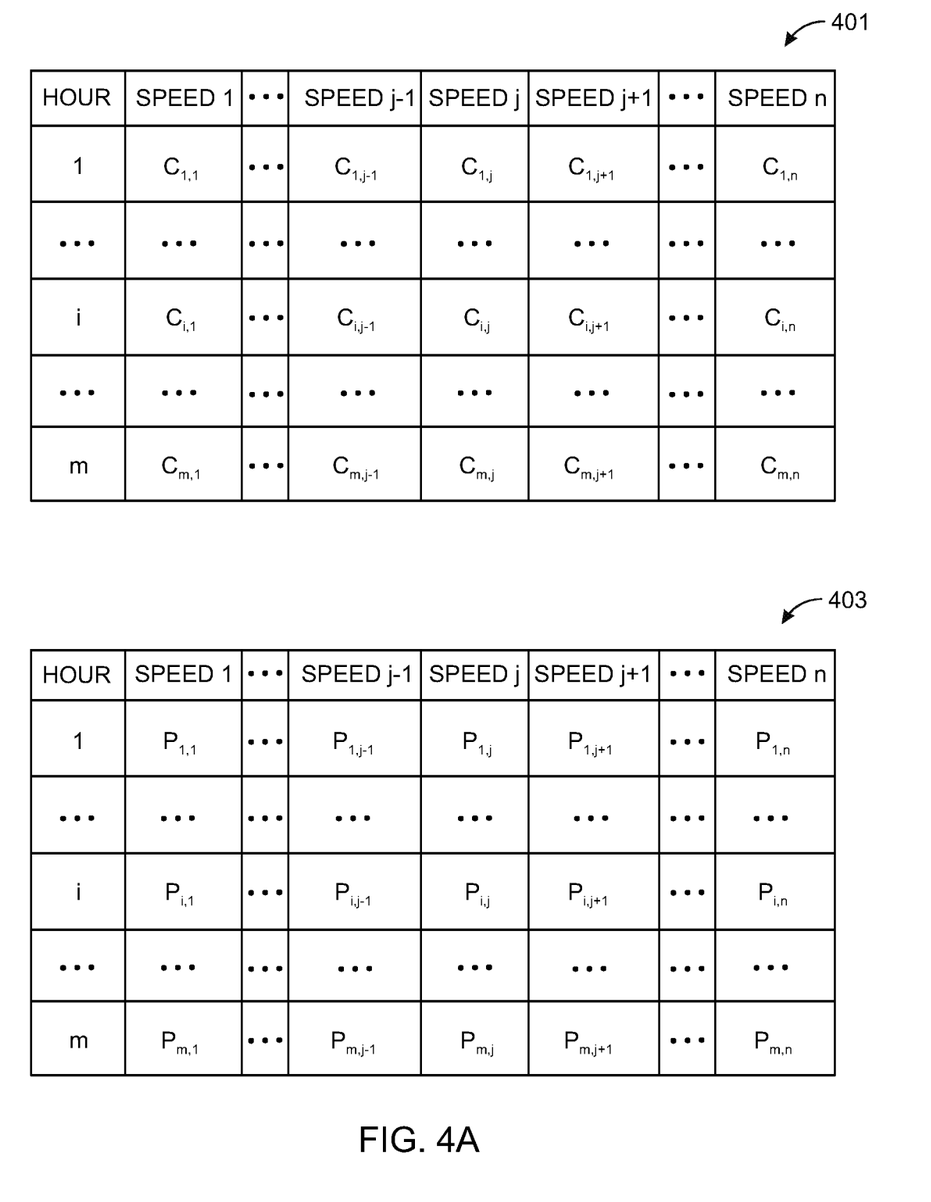
FIG. 4A illustrates matrices depicting data associated with road sign observations for determining one or more features, in accordance with one or more example embodiments.

FIG. 4A illustrates matrices depicting data associated with road sign observations, in accordance with one or more example embodiments. As illustrated in FIG. 4A, a table 401 may correspond to a sign observation count matrix for a specific road sign and a table 403 may correspond to a probability matrix for the sign observation count matrix of table 401.

In various embodiments, the sign observation count matrix 401 may be generated for a specific road sign. According to some embodiments, the specific road sign may correspond to any of the one or more road signs. In various embodiments, sensor data associated with the specific road sign may be obtained, for a period of time, such as a time epoch for generating the sign observation count matrix 401. In various embodiments, the period of time may be 'x' days. In some embodiments, the 'x' may be 1 hour, thus sign observations may be taken hourly. In an example embodiment, the 'x' may be a positive integer. In various embodiments, the obtained sensor data may comprise data associated with counts of road sign observations for the period of time defined by the time epoch 'x'. In various embodiments, a sign observation may be a presence of sign reported by the vehicle sensors for the specific road sign within the period of time at specific locations. For example, if the specific road sign is a speed sign, then the sign observation may correspond to a speed value reported on the speed sign at a particular location. For example, if the obtained sensor data is the data associated with the speed sign, then the obtained sensor data comprises a count (also referred as a number of vehicles reporting one particular speed value for the speed sign) of each speed value posted on the speed sign within the period of time. For example, if the obtained sensor data is the data associated with a one-way sign (i.e. the directional guidance sign which may be one-way or not one-way based on time of a day, vehicle restriction, or the like), then the obtained sensor data comprises a count of one-ways and a count of not one-ways posted on the one-way sign within the period of time.

In various embodiments, the sign observation count matrix 401 may comprise 'm' rows and 'n' columns. In various example embodiments, 'm' may correspond to a total number of time intervals (i.e. epochs) considered for the sign observation. In an example embodiment, 'm' may be a positive integer. For example, if the sign observation count matrix 401 is designed for seven days with one hour as the time interval, then the sign observation count matrix 401 may have 168 rows. In various embodiments, 'n' may correspond to a total number of unique signs observed on the specific road sign. In an example embodiment, 'n' may be a positive integer. For example, if the specific road sign is a speed sign and the total number of unique speed limit values is three, then the sign observation count matrix 401 may have three columns such as speed limit value 1, speed limit value j, and speed limit value n. For example, if the specific road sign is a one-way sign (e.g. one-way during rush hours and not one-way during non-rush hours) and the total number of unique signs is two, then the sign observation count matrix 401 may have two columns such as one-way, and not one-way. In various embodiments, the sign observation count matrix 401 may be a count on the number of sign observations for each time interval at the specific road sign. For example, '$C_{i,j}$' of the sign observation count matrix 401 may correspond to a vehicle count indicating number of times speed limit value j been observed for $i^{th}$ time interval.

In various embodiments, the probability matrix 403 for the sign observation count matrix 401 may comprise 'm' rows and 'n' columns. According to some embodiments, the probability matrix 403 may be computed by performing a row wise normalization for the observed unique signs of the sign observation count matrix 401. For example, the row wise normalization may be computed as $$P_{i,j} = \frac{C_{i,j}}{\Sigma_j C_{i,j}}.$$

In various embodiments, the probability matrix 403 may be used to determine one or more features. For example, various math operations may be performed on the probability matrix 403 to determine the one or more features. In various embodiments, the one or more features may be inputted into a machine learning model to accurately predict the road sign type of the specific road sign. In various embodiments, the machine learning model may be the classification algorithm. Further, the one or more features are detailed in FIG. 4B.

Figure 4B:
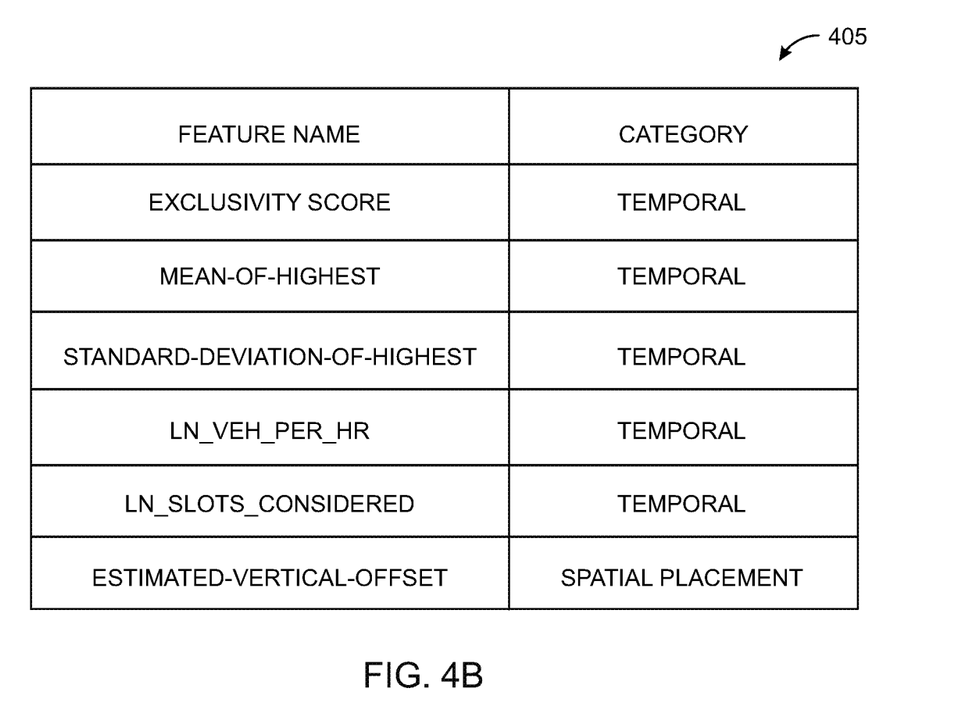
FIG. 4B illustrates a table depicting the one or more features, in accordance with an example embodiment.

FIG. 4B illustrates a table 405 depicting the one or more features, in accordance with an example embodiment. As illustrated in FIG. 4B, the table 405 may comprise an exclusivity score feature, a mean-of-highest feature, a standard-deviation-of-highest feature, an ln_veh_per_hr feature, an ln_slots_considered, and an estimated-vertical-offset feature. In various embodiments, the exclusivity score feature, the mean-of-highest feature, the standard-deviation-of-highest feature, the ln_veh_per_hr feature, and the ln_slots_considered feature may be computed by performing various math operations on the probability matrix 403. Accordingly, the exclusivity score feature, the mean-of-highest feature, the standard-deviation-of-highest feature, the ln_veh_per_hr feature, and the ln_slots_considered feature may be coined as temporal features. According to some embodiments, the obtained sensor data may further comprise vertical offset values (also referred as vertical offset data) for the specific road sign. In various embodiments, the vertical offset value may be a distance above or below a vehicle from the vehicle reference point at which the specific speed sign is located. In various embodiments, the estimated-vertical-offset feature may be computed by performing one or more math operations on the vertical offset data. Accordingly, the estimated-vertical-offset feature may be coined as a spatial placement feature. Further, the computation of each feature in the table 405 will be detailed in FIG. 5.

Figure 5:
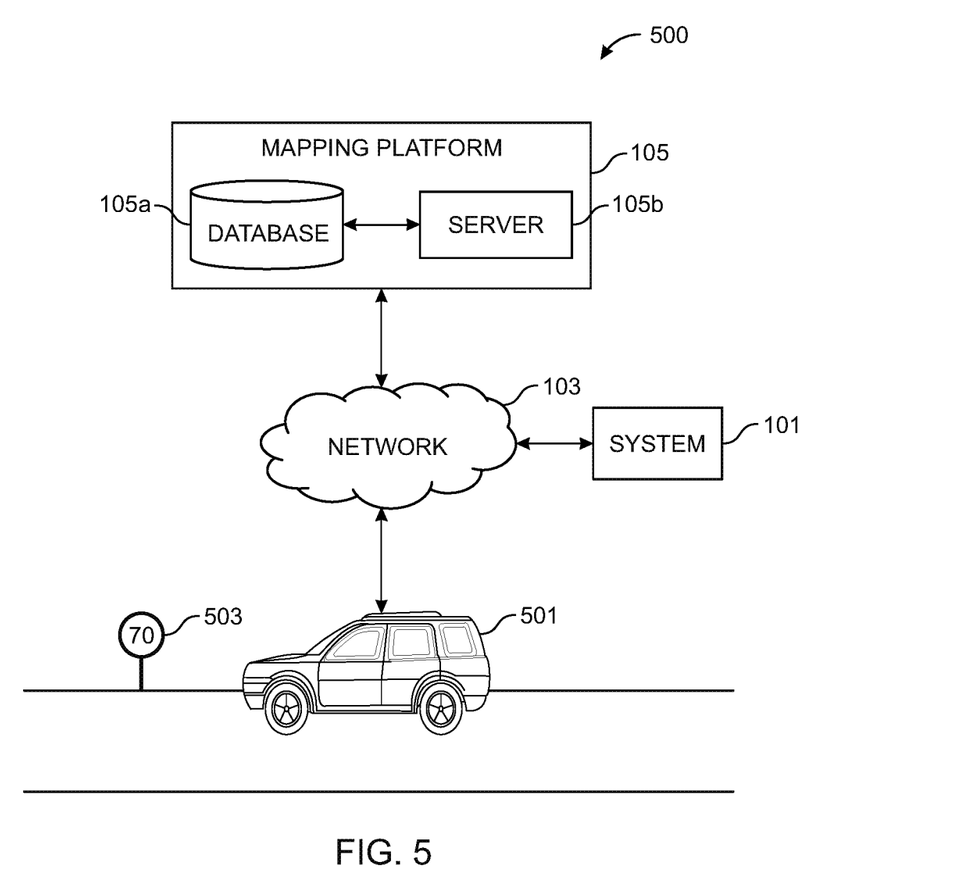
FIG. 5 illustrates a schematic diagram of an exemplary working environment of the system exemplarily illustrated in FIG. 2, in accordance with one or more example embodiments.

FIG. 5 illustrates a schematic diagram 500 of an exemplary working environment of the system exemplarily illustrated in FIG. 2, in accordance with one or more example embodiments. As illustrated in FIG. 5, the schematic diagram 500 may comprise the system 101, the mapping platform 105, the network 103, a vehicle 501 and a speed sign 503. In various embodiments, the vehicle 501 may be an autonomous vehicle, a semiautonomous vehicle, or a manual vehicle. In various embodiments, the vehicle 501 may be equipped with sensors for generating or collecting vehicular sensor data (also referred to as sensor data), related geographic/map data, etc. According to some embodiments, the sensors may comprise image capture sensors configured to capture images of the speed sign 503 along a road. Further, the sensors may comprise one or more position sensors configured to determine location data of the speed sign 503. In various embodiments, the speed sign 503 may be the static speed sign 301, the mechanical variable speed sign 305, the variable speed sign 307, or the conditional static speed sign 303. As used herein, the speed sign 503 may also correspond to any of the one or more road signs. Here, the speed sign 503 is considered for illustration purpose. In various embodiments, the one or more road signs may comprise a speed limit sign, a directional guidance sign, a destination signboard, a signboard indicating route deviation, a parking signboard, a signboard indicating some ongoing work along a route and the like.

In various embodiments, the system 101 may be configured to obtain, from many vehicles (i.e. vehicles such as the vehicle 501), the sensor data associated with the speed sign 503 for a threshold time period (i.e. 'x' days). In an example embodiment, the 'x' may be a positive integer. In various embodiments, the obtained sensor data may comprise data associated with counts of road sign observations for the period of time. According to some embodiments, the obtained sensor data comprises speed limit values reported on speed sign 503 and location data associated with the speed sign 503.

In various embodiments, the system 101 may be configured to generate the sign observation count matrix 401 for the speed sign 503. For example, the system 101 may process on the obtained sensor data to generate the sign observation count matrix 401 (as illustrated in FIG. 4). According to some embodiments, the system 101 may use a sign recognition message and a position estimate message to generate the sign observation count matrix 401. For example, the obtained sensor data may be in sign recognition message formats and position estimate message formats, the system 101 may process on each of the sign recognition message formats and position estimate message formats to determine the sign observation. An exemplary sign recognition message and position estimate message may be as detailed below.

```
       message SignRecognition {
required int64 timeStampUTC_ms = 1;
optional PositionOffset positionOffset = 2;
enum RoadSignTypeEnum {
    SPEED_LIMIT_START = 1;
    SPEED_LIMIT_END = 2;
    CONSTRUCTION_START = 12;
    ...
}
required RoadSignTypeEnum roadSignType = 3;
enum RoadSignPermanencyEnum {
    STATIC = 1;
    VARIABLE = 2;
}
optional RoadSignPermanencyEnum roadSignPermanency = 4;
optional string roadSignValue = 5;
enum RoadSignDependenciesEnum {
    RAIN = 1;
    SNOW = 2;
    ...
}
optional RoadSignRecognitionTypeEnum roadSignRecognitionType = 9;
optional int64 detectedObjectID= 10;
optional int64 mediaID = 11;
optional int32 signRecognitionConfidence_percent = 12;
optional int64 mapMatchedSignID = 13;
optional string unspecifiedSignType = 14;
}
       message PositionEstimate {
required int64 timeStampUTC_ms = 1;
enum PositionTypeEnum {
    RAW_GPS = 1;
    FILTERED = 2;
    MAP_MATCHED_REGULAR_MAP = 3;
    MAP_MATCHED_HD_MAP = 4;
    MAP_MATCHED_HD_MAP_LANE = 5;
}
required PositionTypeEnum positionType = 2;
optional bool interpolatedPoint = 3;
required double longitude_deg = 4;
required double latitude_deg = 5;
required double horizontalAccuracy_m = 6;
optional double altitude_m = 7;
optional double heading_deg = 8;
optional double speed_mps = 9;
enum SpeedDetectionEnum {
    SPEED_RAW_GPS = 1;
    SPEED_WHEEL_TICKS = 2;
    SPEED_RADAR_SONAR = 3;
    SPEED_FILTERED = 4;
}
optional SpeedDetectionEnum speedDetectionType = 13;
enum HeadingDetectionEnum {
    HEADING_RAW_GPS = 1;
    HEADING_MAGNETIC_SENSOR = 2;
    HEADING_MULTI_SENSOR_FUSION = 3;
    HEADING_BY_MAP = 4;
}
optional int32 currentLaneEstimate = 16;
optional int64 mapMatchedLinkID = 17;
optional int32 mapMatchedLinkIDConfidence_percent = 18;
optional double mapMatchedLinkIDOffset_m = 19;
}
```

In various embodiments, the system 101 may be configured to generate a probability matrix 403 for the sign observation count matrix 401. According to some embodiments, the probability matrix 403 may be generated by computing a row wise normalization for the observed speed limit values of the speed sign 503. In some embodiments, the row wise normalization may be computed as $$P_{i,j} = \frac{C_{i,j}}{\Sigma_j C_{i,j}}.$$

In various embodiments, the system 101 may be configured to generate one or more features associated with the speed sign 503 based on the probability matrix 403. For example, the system 101 may process on the probability matrix 403 to generate the one or more features. In various embodiments, the one or more features may be used determine a speed sign type of the speed sign 503. According to some embodiments, the speed sign types may be the static speed sign 301, the mechanical speed sign 305, the variable speed sign 307 and the conditional static speed sign 303. In some embodiments, the vehicle sensors may identify the variable speed sign 307. In such cases, the one or more features may be used to determine whether the speed sign 503 is the static speed sign 301 or the mechanical variable speed sign 305. The conditional static speed sign 303 may be a special case of the static speed sign 301. According to some example embodiments, the one or more features may comprise one or more of the exclusivity score feature, the mean-of-highest feature, the standard-deviation-of-highest feature, the vehicle-per-hour feature, the slots-considered feature, or the estimated-vertical-offset feature, as illustrated in the table 405 disclosed in conjunction with FIG. 4B.

In various embodiments, the exclusivity score feature may be generated/computed using the probability matrix 403. For example, the system 101 may determine a maximum probability value (i.e. a maximum count) for each row of the probability matrix 403, add each of the maximum probability value to generate a sum and divide the sum by the total number of rows in the probability matrix 403. For example, determine, for each row of the probability matrix 403, a $$rowwise(i) = \max_{j}(P_{i,j})$$

and compute a mean for all rowwise(i) values as exclusivity $$score = \frac{\Sigma_i rowwise(i)}{m}.$$

According to some embodiments, the exclusivity score feature may indicate uniqueness of speed limit values of the speed sign 503 for each time interval (i.e. each row of probability matrix 403). The highly unique speed limit value (i.e. not changing) may have a higher exclusivity score. In various embodiments, the exclusivity score may be a strong feature for differentiating the conditional static speed sign 303 from the static speed sign 301 and the mechanical variable speed sign 305. For example, the exclusivity score may have a low value for conditional static speed sign 303 and a high value for both the static speed sign 301 and mechanical variable speed sign 305. For example, the speed limit value for the static speed sign 301 may not change over the time interval and the speed limit value for the mechanical variable speed sign 305 may change at least twice over the time interval. Since, the mechanical variable speed sign 305 have at least two static speed limits, which may switch over the time interval. For example, the mechanical variable speed sign 305 may have a speed limit of 60 kmph for rush hour and a speed limit of 80 kmph for normal traffic hours. The vehicles' sensors may detect both the 60 kmph and 80 kmph speed limits at different times. Therefore, multiple speed limit values may be detected over a time interval. In various embodiments, the exclusivity score may be a temporal feature.

In various embodiments, the mean-of-highest feature may be generated/computed using the probability matrix 403. For example, the system 101 may determine the most observed speed limit value (i.e. a maximum count) and compute a mean for a column (referred as a jmax column) corresponding to the most observed speed limit value. For example, the system 101 may compute the mean for the jmax column as mean-of-highest $$\text{feature} = \frac{\Sigma_j P_{i,jmax}}{m}.$$

In various embodiments, the mean-of-highest feature may be a strong feature for differentiating the static speed sign 301 from the conditional static speed sign 303 and mechanical variable speed sign 305. For example, the mean-of-highest feature may have a high value for static speed sign 301 and a low value for both the conditional static speed sign 303 and the mechanical variable speed sign 307. In various embodiments, the mean-of-highest feature may also be a temporal feature.

In various embodiments, the standard-deviation-of-highest feature may be generated/computed using the probability matrix 403. For example, the system 101 may determine the most observed speed limit value and compute a standard deviation for a column (referred as the jmax column) corresponding to the most observed speed limit value. For example, the system 101 may compute the standard deviation for the jmax column as standard-deviation-of-highest feature=std_dev($\{p_{i,jmax}\}$). In various embodiments, the-standard-deviation-of-highest feature may be a strong feature for differentiating the mechanical variable speed sign 305 from the conditional static speed sign 303 and the static speed sign 301. For example, the standard-deviation-of-highest feature may have a high value for mechanical variable speed sign 305 and a low value for both the conditional static speed sign 303 and the static speed sign 301. In various embodiments, the standard deviation of highest value may be the temporal feature.

In various embodiments, the vehicle-per-hour feature (also referred as the ln_mean_veh_per_hr) may be generated/computed using the probability matrix 403. For example, the system 101 may determine a mean number of vehicles observed for each time interval and compute a natural logarithm of the determined mean. For example, the system 101 may compute the vehicle-per-hour feature as $$\text{ln\_mean\_veh\_per\_hr} = \ln\left(\frac{\Sigma_{i,j} C_{i,j}}{m} + 1\right)$$

(also referred to be ln(mean_veh_per_hr+1)). In various embodiments, the ln_mean_veh_per_hr feature may be a reliability feature, a Meta feature, or the like, for providing a reliability value to the calculated feature values based on the number of vehicles. That is to say, the vehicle-per-hour feature may be used for determining whether to consider or not to consider the exclusivity score feature, the mean-of-highest feature, and the standard-deviation-of-highest feature. For example, if the sign observations (i.e. vehicles count) used to calculate the exclusivity score feature, the mean-of-highest feature, and the standard-deviation-of-highest value are less, then the exclusivity score feature, the mean-of-highest feature, and the standard-deviation-of-highest feature may not be accurate. Since, the observations may be erroneous observations. This is because when very low numbers of vehicles pass by the road sign, the road sign observations, and thus, the derived features may contain significant erroneous values. In a way, the vehicle-per-hour feature helps to contain the number of observations and prediction. In various embodiments, the ln_mean_veh_per_hr may also be a temporal feature.

In various embodiments, the slots-considered feature (also referred as the ln_slots_considered) may be generated/computed using the probability matrix 403. For example, the system 101 may determine a total number of time intervals considered for the probability matrix 403 and compute the natural logarithm of the total number of time intervals. For example, the system 101 may compute the slots-considered feature as ln_slots_considered=ln(m). In various embodiments, the ln_slots_considered feature may be a reliability feature, a Meta feature, or the like for determining the number of observations to be considered for computing the exclusivity score feature, the mean-of-highest feature, and the standard-deviation-of-highest feature. For example, if the sign observations (i.e. vehicles count) used to calculate the exclusivity score feature, the mean-of-highest feature, and the standard-deviation-of-highest feature are less, then the exclusivity score feature, the mean-of-highest feature, and the standard-deviation-of-highest feature may not be accurate. Since, the observations may be erroneous observations. In various embodiments, the ln_slots_considered may be the temporal feature.

In various embodiments, the estimated-vertical-offset feature (also referred as est_verticaloffset) may be generated/computed using the sensor data. According to some embodiments, the sensor data may comprise vertical offset values (also referred as vertical offset data) for the speed sign 503. In various embodiments, the vertical offset value may be a distance above or below a vehicle from the vehicle reference point at which the speed sign 503 is located. According to some embodiments, the mechanical variable speed sign 305 may be located at higher heights in comparison with the static speed sign 301. For example, the mechanical variable speed sign 305 may be placed on the middle of the road such as on a gantry or the like, but the static speed sign 301 may be located by side of the road using a pole. In various embodiments, the vertical offset value may be measured in meter. In various embodiments, the est_verticaloffset feature associated with the speed sign 503 may be computed by determining a median for the vertical offset values. In various embodiments, the estimated-vertical-offset feature may be a spatial placement feature.

In various embodiments, the system 101 may be configured to input the one or more features into the machine learning model to determine the sign type. In various embodiments, the machine learning model may be the classification algorithm. In various embodiments, the classification algorithm may be the random forest algorithm. According to some embodiments, the classification algorithm may be the support vector machine (SVM) algorithm, the neural network (NN) algorithm, the gradient boosting machine (GBM) algorithm, or the like.

As should be understood, the machine learning model (such as using the random forest algorithm) may be pre-trained with the one or more features determined for a plurality of speed signs. In various embodiments, the one or more features for the plurality of speed signs may be determined as discussed above. In various embodiments, the plurality of speed signs may comprise the static speed sign 301, the mechanical variable speed sign 305, the variable speed sign 307, and the conditional static speed sign 303. In various embodiments, in training phase, the machine learning model may combine the entire one or more features of the plurality of speed signs to provide weight for each of the one or more features of the plurality of speed signs. In various embodiments, the machine learning model (i.e. random forest) may use Mean-decrease-Accuracy scale and Mean-Decrease-Gini scale for weighting the one or more features of the plurality of speed signs. In various embodiments, the pre-trained machine learning model may determine the sign type of the speed sign 503 based on the one or more features associated with the speed sign 503. For example, the pre-trained machine learning model (i.e. the machine learning model with pre-computed weights) may take input as the one or more features associated with the speed sign 503 and determine the sign type of the speed sign 503.

In various embodiments, the system 101 may be configured to update the map data/road sign data of a road sign database based on the determined sign type. For example, if the determined sign type is the static speed sign 301, the system 101 may update the speed limit value of the speed sign 503 and the location data associated with the speed sign 503. For example, if the determined sign type is the mechanical variable speed sign 305, the system 101 may add the speed sign 503 to a blacklist. According to some embodiments, the system 101 may configured to generate alert signals/messages to inform the user of the vehicle based on the updated road sign data. In some embodiments, the system 101 may configured to generate control signals for controlling the vehicle in an autonomous or semi-autonomous manner.

In this way, example embodiments of the system 101 determine the road sign type of the road sign accurately and update the road sign information. The updated road sign information may be used to perform one or more navigation functions. Some non-limiting examples of navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

Figure 6:
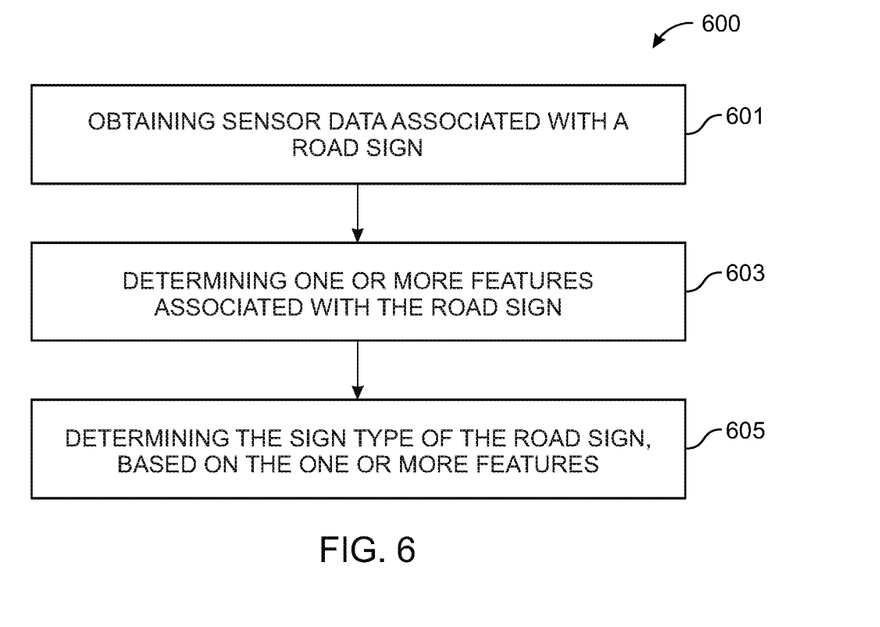
FIG. 6 illustrates a flowchart depicting a method for determining a sign type of a road sign, in accordance with one or more example embodiments.

FIG. 6 illustrates a method 600 for determining the sign type of the road sign, in accordance with one or more example embodiments. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 600 illustrated by the flowchart diagram of FIG. 6 for determining the sign type of the road sign may include, at step 601, obtaining sensor data associated with the road sign, wherein the sensor data comprises data associated with counts of road sign observations. In various embodiments, the sensor data associated with the specific road sign may be obtained, for a period of time, such as a time epoch for generating the sign observation count matrix 401. In various embodiments, the period of time may be 'x' days. In some embodiments, 'x' may be 1 hour, thus sign observations may be taken hourly. In an example embodiment, 'x' may be a positive integer. In various embodiments, the obtained sensor data may comprise data associated with counts of road sign observations for the period of time defined by the time epoch 'x'. According to some embodiments, the obtained sensor data may further comprise vertical offset values (also referred as vertical offset data) for the specific road sign.

The method 600, at step 603 may include determining one or more features associated with the road sign, based on the obtained sensor data. In various embodiments, the probability matrix 403 may be used to determine one or more features. For example, various math operations may be performed on the probability matrix 403 to determine the one or more features. In various embodiments, the one or more features may be inputted into a machine learning model to accurately predict the road sign type of the specific road sign. In various embodiments, the machine learning model may be the classification algorithm. According to some example embodiments, the one or more features may comprise one or more of the exclusivity score feature, the mean-of-highest feature, the standard-deviation-of-highest feature, the vehicle-per-hour feature, the slots-considered feature, or the estimated-vertical-offset feature.

The method 600, at step 605 may include determining the sign type of the road sign, based on the one or more features. In various embodiments, the system 101 may be configured to input the one or more features into the machine learning model to determine the sign type. In various embodiments, the machine learning model may be the classification algorithm. In various embodiments, the classification algorithm may be random forest algorithm. According to some embodiments, the classification algorithm may be the support vector machine (SVM) algorithm, the neural network (NN) algorithm, the gradient boosting machine (GBM) algorithm, or the like. In various embodiments, the pre-trained machine learning model may determine the sign type of the road sign based on the one or more features associated with the road sign. For example, the pre-trained machine learning model (i.e. the machine learning model with pre-computed weights) may take input as the one or more features associated with the road sign and determine the sign type of the road sign.

According to some example embodiments, the method 600 may include various other steps not shown in FIG. 6. For example, the method 600 may further include updating map data of the road sign (such as updating the map database 105a or other database), based on the determined sign type. Furthermore, the sign type indicates that the road sign is one of a static sign or a mechanical variable sign. Furthermore, the method 600 may include updating a location of the road sign, based on the determined sign type indicating that the road sign is the static sign. Furthermore, the method 600 may include adding the road sign to a blacklist, based on the determined sign type indicating that the road sign is the mechanical variable sign. The blacklist may correspond to a list of road signs that are found to be the mechanical variable signs. The blacklist may be utilized while updating the map data of the road sign. More specifically, the road sign added in the blacklist may not be considered while updating the map data. For example, when a sign observation is reported to the map database, the map database may invoke the blacklist to determine if the road sign corresponding to the sign observation is a mechanical variable sign. If in case it is found that the reported sign observation corresponds to a mechanical variable sign, the map database may discard the sign observation (i.e. the sign observation is not learned). Furthermore, the method 600 may include generating a first matrix, such as the matrix 401, based on the obtained sensor data, wherein the first matrix is a representation of the counts of the road sign observations over a threshold time period and generating a second matrix, such as the matrix 403, based on the first matrix, wherein the second matrix comprises row wise normalized counts of the road sign observations. Furthermore, the one or more features comprise an exclusivity score feature, a mean-of-highest feature, or a standard-deviation-of-highest feature and wherein determining the one or more features further comprises one or more of: determining a maximum count in each row of the second matrix and computing a mean of the maximum counts, determining a max column in the second matrix that has a maximum count in the second matrix and computing a mean for the max column of the second matrix, or computing a standard deviation for the max column of the second matrix. Furthermore, the one or more features further comprise an estimated-vertical-offset feature, and wherein determining the estimated-vertical-offset-feature further comprises: obtaining vertical offset data associated with the road sign and computing a median for the obtained vertical offset data. Furthermore, the method 600 may include inputting the one or more features into a machine learning model to determine the sign type of the road sign.

In an example embodiment, a system for performing the method of FIG. 6 above may comprise a processor (e.g. the processor 201) configured to perform some or each of the operations (601-605) described above. The processor may, for example, be configured to perform the operations (601-605) by performing hardware implemented logical functions, executing stored instructions, or executing algorithms for performing each of the operations. Alternatively, the system may comprise means for performing each of the operations described above. In this regard, according to an example embodiment, examples of means for performing operations 601-605 may comprise, for example, the processor 201 and/or a device or circuit for executing instructions or executing an algorithm for processing information as described above.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for determining a sign type of a road sign, the system comprising:
 a memory configured to store computer-executable instructions; and
 one or more processors configured to execute the instructions to:
  obtain sensor data associated with the road sign, wherein the sensor data comprises data associated with counts of road sign observations;
  determine one or more features associated with the road sign, based on the obtained sensor data; and
  determine the sign type of the road sign, based on the one or more features, wherein the sign type indicates that the road sign is one of a static sign or a mechanical variable sign, wherein the one or more processors are further configured to update map data of the road sign, based on the determined sign type, wherein to update the map data, the one or more processors are further configured to add the road sign to a blacklist, based on the determined sign type indicating that the road sign is the mechanical variable sign.

2. A system for determining a sign type of a road sign, the system comprising:
 a memory configured to store computer-executable instructions; and
 one or more processors configured to execute the instructions to:
  obtain sensor data associated with the road sign, wherein the sensor data comprises data associated with counts of road sign observations;
  determine one or more features associated with the road sign, based on the obtained sensor data; and determine the sign type of the road sign, based on the one or more features, wherein to determine the one or more features, the one or more processors are further configured to:

generate a first matrix based on the obtained sensor data, wherein the first matrix is a representation of the counts of the road sign observations over a threshold time period; and generate a second matrix based on the first matrix, wherein the second matrix comprises row wise normalized counts of the road sign observations.

3. The system of claim 2, wherein the one or more features comprise an exclusivity score feature, a mean-of-highest feature, or a standard-deviation-of-highest feature and wherein to determine the one or more features, the one or more processors are further configured to perform one or more of:

determine a maximum count in each row of the second matrix and compute a mean of the maximum counts;

determine a max column in the second matrix that has a maximum count in the second matrix and compute a mean for the max column of the second matrix; or compute a standard deviation for the max column of the second matrix.

4. The system of claim 3, wherein the one or more features further comprise an estimated-vertical-offset feature, and wherein to determine the estimated-vertical-offset-feature, the one or more processors are further configured to:

obtain vertical offset data associated with the road sign; and compute a median for the obtained vertical offset data.

5. The system of claim 4, wherein the one or more processors are further configured to input the one or more features into a machine learning model to determine the sign type of the road sign.

6. A method for determining a sign type of a road sign, the method comprising:

obtaining sensor data associated with the road sign, wherein the sensor data comprises data associated with counts of road sign observations;

determining one or more features associated with the road sign, based on the obtained sensor data;

determining the sign type of the road sign, based on the one or more features, wherein the sign type indicates that the road sign is one of a static sign or a mechanical variable sign;

updating map data of the road sign, based on the determined sign type, wherein updating the map data further comprises adding the road sign to a blacklist, based on the determined sign type indicating that the road sign is the mechanical variable sign; and utilizing the updated map data to perform a navigation function of a vehicle.

7. The method of claim 6, wherein determining the one or more features further comprises:

generating a first matrix based on the obtained sensor data, wherein the first matrix is a representation of the counts of the road sign observations over a threshold time period; and generating a second matrix based on the first matrix, wherein the second matrix comprises row wise normalized counts of the road sign observations.

8. The method of claim 7, wherein the one or more features comprise an exclusivity score feature, a mean-of-highest feature, or a standard-deviation-of-highest feature and wherein determining the one or more features further comprises one or more of:

determining a maximum count in each row of the second matrix and computing a mean of the maximum counts;

determining a max column in the second matrix that has a maximum count in the second matrix and computing a mean for the max column of the second matrix; or computing a standard deviation for the max column of the second matrix.

9. The method of claim 8, wherein the one or more features further comprise an estimated-vertical-offset feature, and wherein determining the estimated-vertical-offset-feature further comprises:

obtaining vertical offset data associated with the road sign; and computing a median for the obtained vertical offset data.

10. The method of claim 9, further comprising inputting the one or more features into a machine learning model to determine the sign type of the road sign.

* * * * *